(12) United States Patent
Shamoon (10) Patent No.: US 6,276,675 B1
(45) Date of Patent: Aug. 21, 2001

(54) CUTTINGBOARD

(76) Inventor: Ellis N. Shamoon, 2833 Park Bridge Ct., Dallas, TX (US) 75219

( * ) Notice: Subject to any disclaimer, the term of this patent is extended or adjusted under 35 U.S.C. 154(b) by 0 days.

(21) Appl. No.: 09/557,587

(22) Filed: Apr. 22, 2000

(51) Int. Cl.⁷ .................................................. B23Q 3/00
(52) U.S. Cl. ..................... 269/289 R; 269/13; 269/15; 269/302.1; 222/158
(58) Field of Search ....................... 269/289 R, 302.1, 269/313, 303, 900; 451/552, 555, 461

(56) References Cited

U.S. PATENT DOCUMENTS

| | | |
|---|---|---|
| 4,041,964 | 8/1977 | Shamoon . |
| 4,456,021 | 6/1984 | Leavens . |
| 4,653,737 * | 3/1987 | Haskins et al. ................... 269/302.1 |
| 4,798,372 * | 1/1989 | Tingle ................................ 269/59.5 |
| 5,363,755 * | 11/1994 | Liang ................................ 269/302.1 |
| 5,366,208 * | 11/1994 | Benjamin ............................... 269/13 |
| 5,499,666 * | 3/1996 | Foster et al. ............................ 141/96 |
| 5,527,022 * | 6/1996 | Gibson .................................... 269/13 |
| 5,860,641 * | 1/1999 | Hearth ............................. 269/289 R |
| 5,904,271 * | 5/1999 | Collins et al. ....................... 222/158 |

* cited by examiner

Primary Examiner—Joseph J. Hail, III
Assistant Examiner—Daniel Shanley
(74) Attorney, Agent, or Firm—Daniel V. Thompson (57) ABSTRACT

A cuttingboard has a planar top cutting surface with an aperture formed therein. A first removable container is adapted for secured positioning in the aperture and has impermeable walls for the containment of liquids and solids. A second removable container is also adapted for secured positioning in the aperture and has at least one permeable wall for the containment of solids and outward passage of liquids. The first and second removable containers are sized so the second removable container may be nested within the first removable container. The cuttingboard has extendable legs with foot portions encased in thermoplastic elastomer material.

16 Claims, 7 Drawing Sheets

CUTTINGBOARD

TECHNICAL FIELD

The present invention relates to kitchen devices, and more particularly to a cuttingboard adapted for the simultaneous preparation and washing of foods positioned thereon.

BACKGROUND ART

It is generally the practice in the kitchens of restaurants and homes to cut and wash foods such as vegetables in preparation for cooking and serving them. Usually a separate cuttingboard is utilized in the vicinity of a sink for preparation of the vegetables and other foodstuffs. The conventional cuttingboard is made of material which can withstand the cutting action of knives and the like and is generally large and heavy enough to accommodate food storage and to remain stationary during cutting pressure and motions. Larger cuttingboards, while more efficient in use, are generally bulkier and more inconvenient to handle and wash than smaller and lighter weight cuttingboards.

However, smaller, lighter weight cuttingboards generally have a tendency to move under heavy cutting action and therefore require stabilizing.

With either type of board, it is generally necessary to move the board to the sink for washing the cut vegetables and/or the board itself. When washing cut vegetables, it is often expedient to utilize a strainer, colander or the like. In such instances it is necessary to transfer the vegetables to the strainer and to then discard the unwanted trimmed portions, either in a trash receptacle or a sink disposal unit. In other instances, it is desired to not lose the juices resulting from cutting and preserve them with the cut portions, in such instances the foodstuffs on the cuttingboard are moved to a separate bowl, which, in the absence of great dexterity, can be a messy, inefficient operation. In yet other instances it is desire to separate the solid cut portions from the liquids, yet capture the liquids for subsequent preparation steps.

It would be an advantage therefore to overcome certain of the problems and inconveniences of prior art apparatus by providing an improved kitchen cuttingboard which can be used directly over a kitchen sink, is lightweight and, yet, is easily and effectively stabilized during use. The cuttingboard of the present invention is especially adapted for use directly over a sink and for accommodating the simultaneous washing and discarding of portions of vegetables and the like prepared thereon. In this manner, the operation of cutting, storing, washing and discarding foodstuffs is facilitated directly in the area in which each of the above functions is most expeditiously effected and in the most sanitary configuration.

SUMMARY OF THE INVENTION

The cuttingboard of the present invention has a planar top cutting surface with an aperture formed therein. A first removable container is adapted for secured positioning in the aperture and has impermeable walls for the containment of liquids and solids. A second removable container is also adapted for secured positioning in the aperture and has at least one permeable wall for the containment of solids and outward passage of liquids. The first and second removable containers are sized so the second removable container may be nested within the first removable container. The cuttingboard has extendable legs with foot portions encased in thermoplastic elastomer material

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Referring to FIGS. 1–8, where like numerals indicate like and corresponding elements, cuttingboard 10 is provided for use in kitchens in the preparation of foods. The cuttingboard 10 includes a main body 12 having a planar top cutting surface 14. The main body 12 is adapted for generally horizontal positioning.

In one embodiment of the invention, the main body 12 has an aperture 16 formed therein between the planar top cutting surface 14 and a planar bottom cutting surface 18. A first removable container 20 is adapted for secured positioning in the aperture 16, with the first removable container 20 having impermeable walls 22 for the containment of liquids and solids. A second removable container 24 is also adapted for secured positioning in the aperture 16. The second removable container 24 has at least one permeable wall 26 for the containment of solids and outward passage of liquids.

Figure 5:
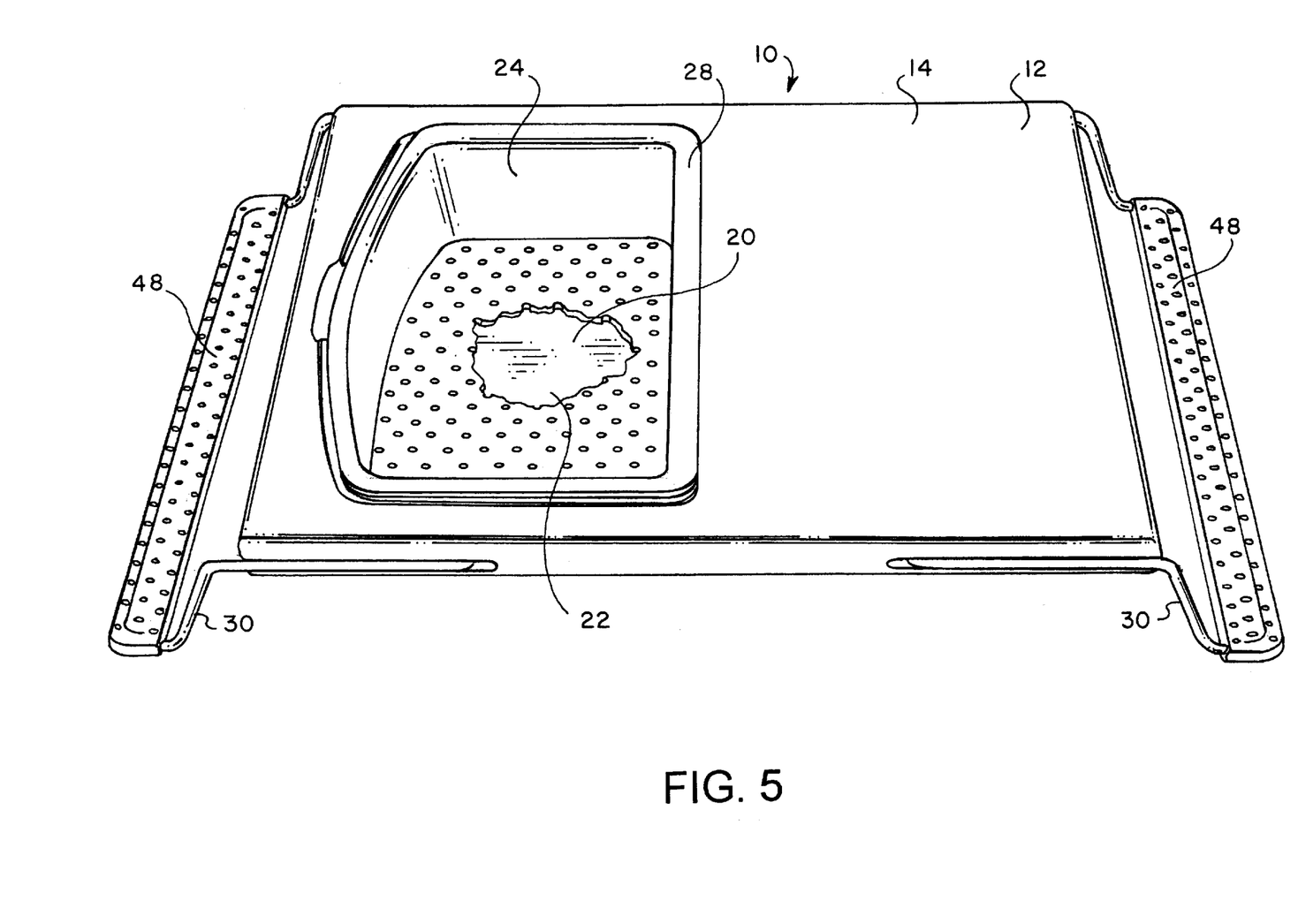
FIG. 5 is a front-top perspective view of the cuttingboard with the first and second removable containers.
Figure 6:
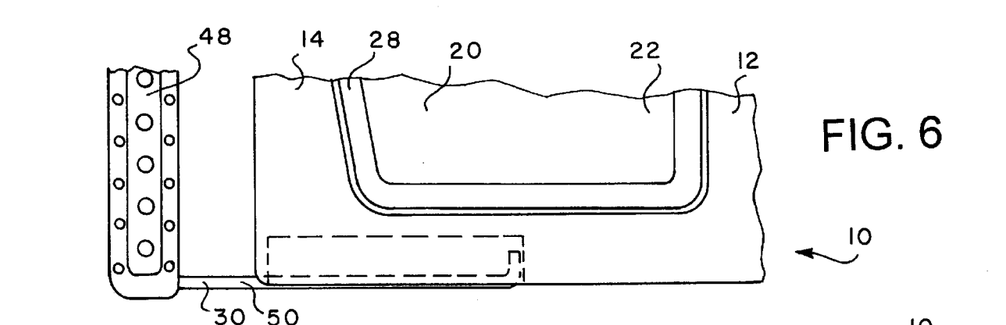
FIG. 6 is a partial top view of leg connection to the cuttingboard.
Figure 7:
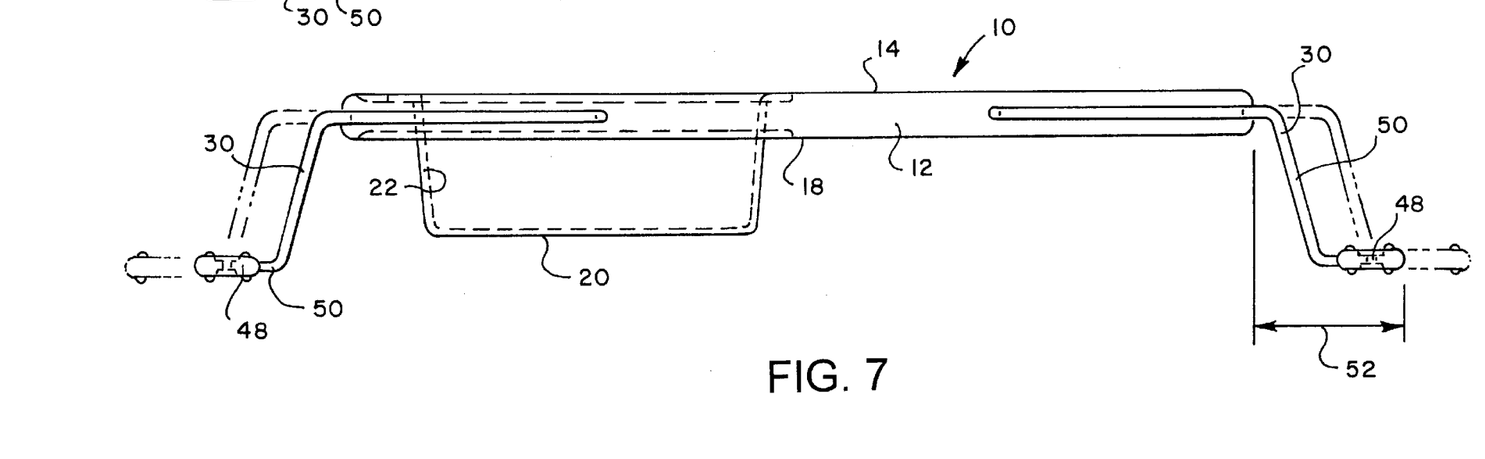
FIG. 7 is a side view of the cuttingboard.

As best shown in FIG. 5, the first and second removable containers 20, 24 are sized so the second removable container 24 may be nested within the first removable container 20.

Figure 3:
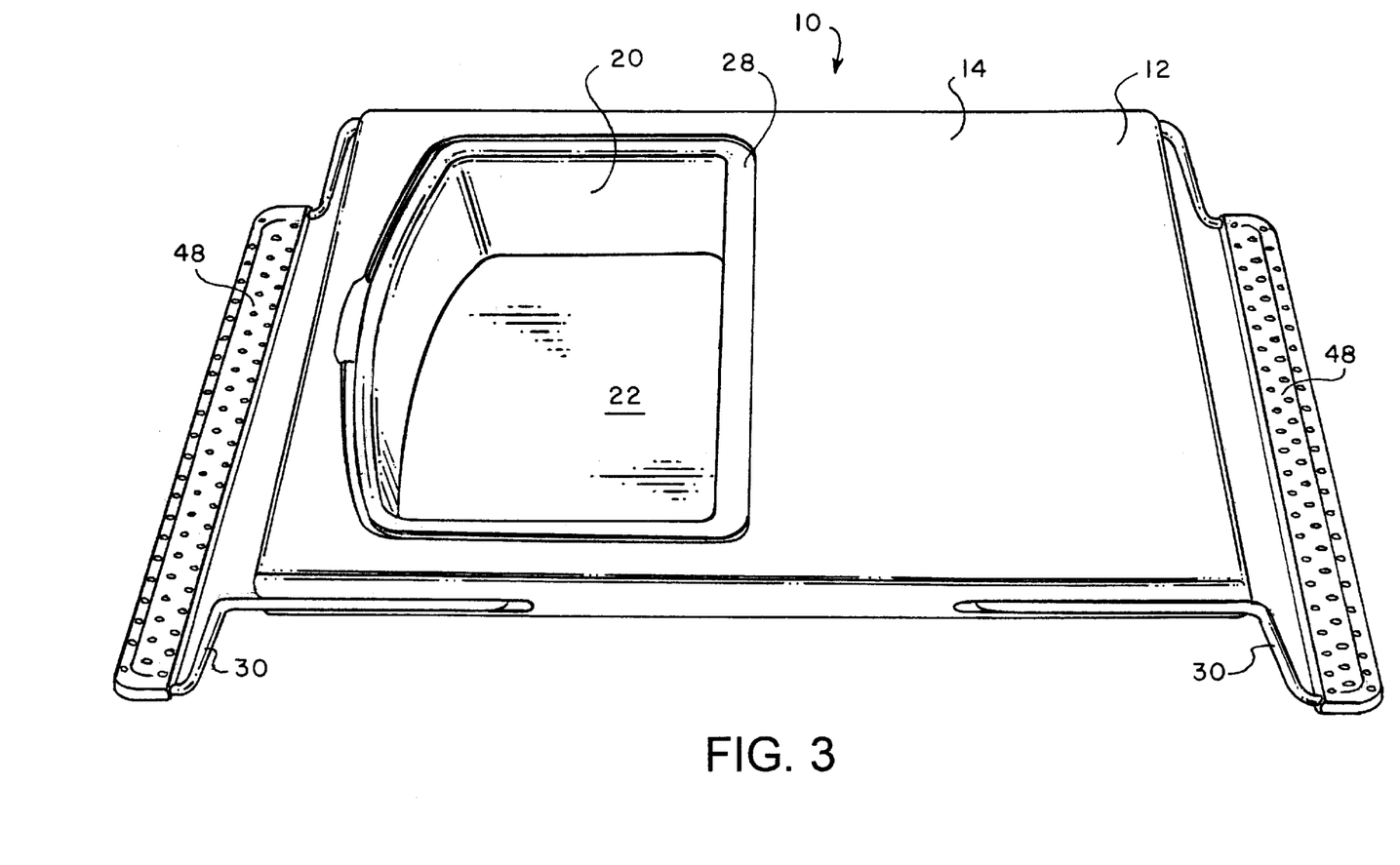
FIG. 3 is a front-top perspective view of the cuttingboard with a first removable container.
Figure 4:
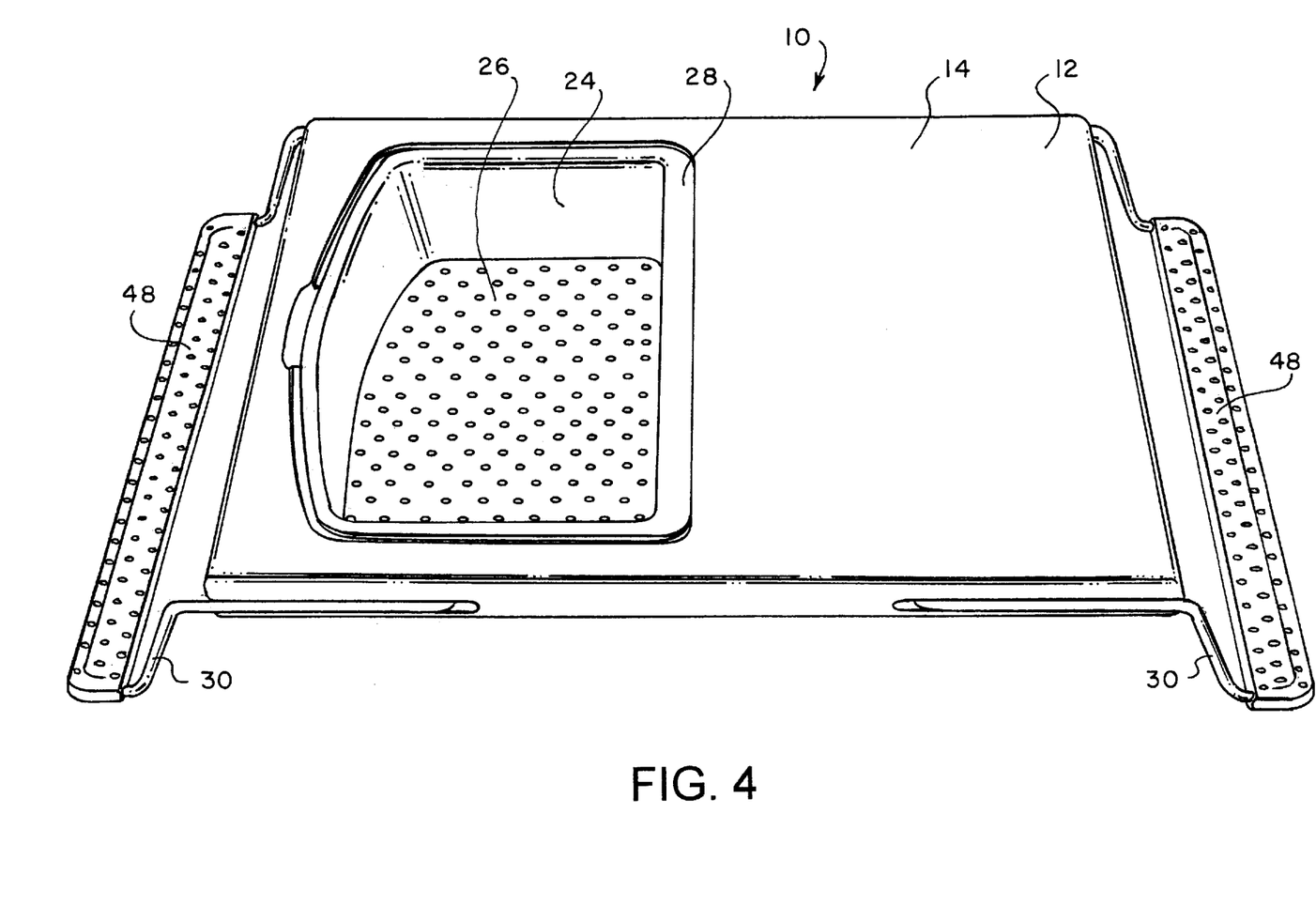
FIG. 4 is a front-top perspective view of the cuttingboard with a second removable container.

The aperture 16 and first and second removable containers 20, 24 have cooperating support structure to permit optional nested support of the first and second removable containers 20, 24 within the aperture 16 (FIG. 5) or singular support of the first or second removable containers within the aperture (FIGS. 3 and 4). The cooperating support structure includes outwardly-extending lips 28 about the perimeters of each removable container 20, 24. The lips 28 are sized more largely than the aperture 16 for support of the removable containers 20, 24. Aperture 16 is provided with a perimeter recess 29 (FIG. 1) for engagement of the lips 28.

Figure 8:
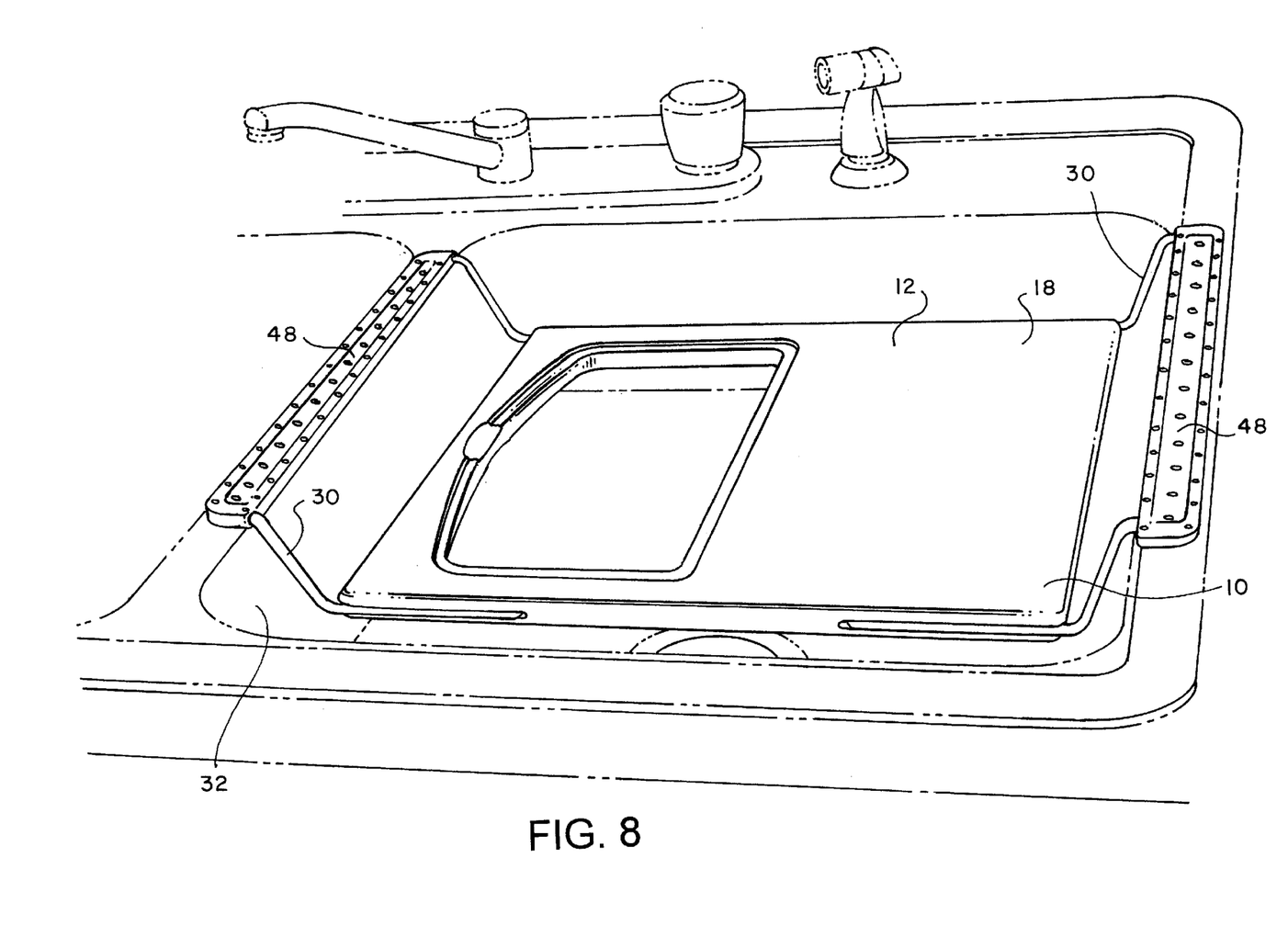
FIG. 8 is a right-top perspective view of the cuttingboard in a sink.

The cuttingboard 10 includes legs 30 extending from the main body 12 for supporting the cuttingboard 10. Legs 30 are configured for optional support of the cuttingboard either above a work surface, as best shown in FIGS. 3–7, or within a sink 32, as best shown in FIG. 8.

Figure 1:
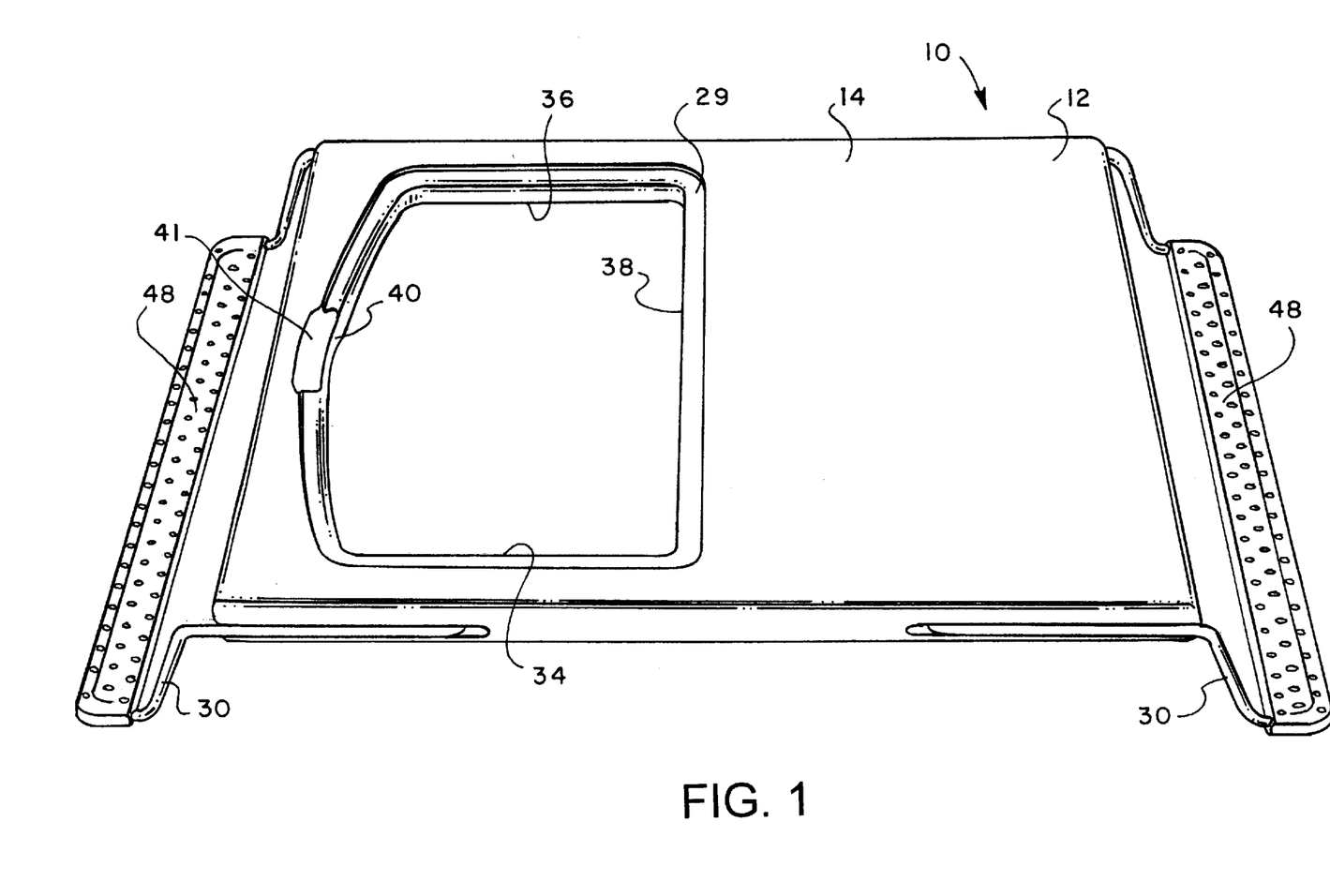
FIG. 1 is a front-top perspective view of a cuttingboard without containers.

The aperture 14 is generally "D"-shaped, with front and back equal-length, parallel sides 34, 36 (FIG. 1). An inner side 38 is joined to the front and back sides 34, 36 and is straight and perpendicular to the front and back sides 34, 36. An outer side 40 is joined to the front and back sides 34, 36 and is outwardly curved. A thumb recess 41 is provided in outer side 40.

Figure 2:
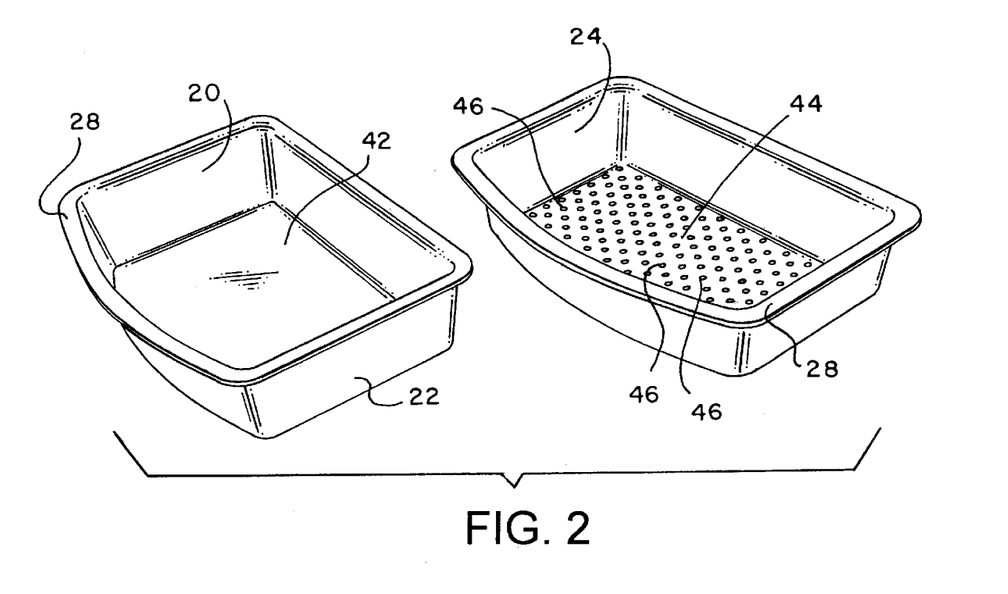
FIG. 2 is a right-top perspective view of the removable containers.

The removable containers 20, 24 have generally planar bottom surfaces 42, 44 (FIG. 2). The bottom surface 44 of the second removable container 24 is perforated with a plurality of drain holes 46.

In another aspect of the invention, legs 30 have rubber-like foot portions 48. The legs 30 are formed of bent metal wires 50. The foot portions 48 are formed of overmolded thermoplastic elastomer. Legs 30 extend longitudinally a distance of extension 52 (FIG. 7) beyond the ends 52 of the cuttingboard. The distance of extension 52 of the legs 30 is adjustable.

In operation, the improved cuttingboard of the present invention permits foodstuffs to be cut on the main body of the cuttingboard then conveniently transferred by sliding into one or both of the nestable, removable containers. Where the cuttings are to be washed and drained, only the second, permeable container is used. Where the cuttings do not need washing either container may be used. Where the cuttings are juicy, and the juice is to be retained, the first, impermeable container is used. Where the juice is to be retained but separated from the solids, both containers are used.

The "D"-shaped aperture and curved outer sides of the containers allow the containers to be easily manipulated. The thumb recess in the curved outer side of the aperture is provided for easy engagement with the lips of the containers. The perimeter recess about the aperture enables the container lips to be flush or slightly below the top cutting surface, permitting cuttings to be easily slid into the container(s).

The cuttingboard can be used in either of two alternative positions. When used with the feet down, the cutting board may be placed on any table or counter top. When used with the feet up, the cuttingboard may be suspended over a sink. The rubber-like feet on the legs inhibit sliding of the cuttingboard in both positions. The distance of extension of the legs is adjustable to adapt to sinks of varying widths.

It will be understood that each of the elements described above, or two or more together, may also find a useful application in other types of constructions differing from the type described above.

While the invention has been illustrated and described as embodied in a braking systems, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

Whereas, the present invention has been described with respect to a specific embodiment thereof, it will be understood that various changes and modifications will be suggested to one skilled in the art and it is intended to encompass such changes and modifications as fall within the scope of the appended claims.

I claim:

1. A cuttingboard for use in kitchens in the preparation of foods, the cuttingboard comprising:
a main body having a planar top cutting surface, the main body adapted for generally horizontal positioning, and the main body having an aperture formed therein between the planar top cutting surface and a bottom surface;
a first removable container adapted for secured positioning in the aperture, the first removable container having impermeable walls for the containment of liquids and solids;
a second removable container adapted for secured positioning in the aperture, the second removable container having at least one permeable wall for the containment of solids and outward passage of liquids; and
the first and second removable containers being sized so the second removable container may be nested within the first removable container.

2. The cuttingboard of claim 1 with the aperture and first and second removable containers having cooperating support structure to permit optional nested support of the first and second removable containers within the aperture or singular support of the first or second removable containers within the aperture.

3. The cuttingboard of claim 2 with the cooperating support structure including outwardly-extending lips about the perimeters of each removable container, the lips being sized more largely than the aperture for support of the removable containers.

4. The cuttingboard of claim 1 with legs extending from the main body for supporting the cuttingboard above a work surface.

5. The cuttingboard of claim 4 having a planar bottom cutting surface and with the legs being configured for optional support of the cuttingboard either above a work surface or within a sink.

6. The cuttingboard of claim 1 with legs extending from the main body for supporting the cuttingboard within a sink.

7. The cuttingboard of claim 1 with the aperture being generally "D"-shaped, with front and back equal-length, parallel sides, an inner side joined to the front and back sides and being straight and perpendicular to the front and back sides, and with an outer side joined to the front and back sides and being outwardly curved.

8. The cuttingboard of claim 1 with the removable containers having generally planar bottom surfaces.

9. The cuttingboard of claim 8 with the bottom surface of the second removable container being perforated with a plurality of drain holes.

10. A cuttingboard for use in kitchens in the preparation of foods, the cuttingboard comprising:
a main body having a planar top cutting surface, the main body adapted for generally horizontal positioning, and the main body having an aperture formed therein between the planar top cutting surface and a bottom surface;
a first removable container adapted for secured positioning in the aperture, the first removable container having impermeable walls for the containment of liquids and solids;
a second removable container adapted for secured positioning in the aperture, the second removable container having at least one permeable wall for the containment of solids and outward passage of liquids;
the first and second removable containers being sized so the second removable container may be nested within the first removable container;
with the aperture and first and second removable containers having cooperating support structure to permit optional nested support of the first and second removable containers within the aperture or singular support of the first or second removable containers within the aperture;

the cooperating support structure including outwardly-extending lips about the perimeters of each removable container, the lips being sized more largely than the aperture for support of the removable containers;

with a planar bottom cutting surface and with legs extending from the main body for supporting the cuttingboard, the legs being configured for optional support of the cuttingboard either above a work surface or within a sink;

the aperture being generally "D"-shaped, with front and back equal-length, parallel sides, an inner side joined to the front and back sides and being straight and perpendicular to the front and back sides, and with an outer side joined to the front and back sides and being outwardly curved;

with the removable containers having generally planar bottom surfaces; and the bottom surface of the second removable container being perforated with a plurality of drain holes.

11. A cuttingboard for use in kitchens in the preparation of foods, the cuttingboard comprising:

a main body having a planar top and bottom cutting surfaces, the main body adapted for generally horizontal positioning; and with legs extending from the main body for supporting the cuttingboard, the legs being configured for optional support of the cuttingboard either above a work surface or within a sink.

12. The cuttingboard of claim 11 with the legs including rubber-like foot portions.

13. The cuttingboard of claim 12 with the legs formed of bent metal wire and the foot portions being overmolded thermoplastic elastomer.

14. The cuttingboard of claim 11 with the legs extending longitudinally a distance of extension beyond the ends of the cuttingboard.

15. The cuttingboard of claim 14 with the distance of extension of the legs being adjustable.

16. A cuttingboard for use in kitchens in the preparation of foods, the cuttingboard comprising:

a main body having a planar top and bottom cutting surfaces, the main body adapted for generally horizontal positioning;

with legs extending from the main body for supporting the cuttingboard, the legs being configured for optional support of the cuttingboard either above a work surface or within a sink;

with the legs including rubber-like foot portions;

with the legs formed of bent metal wire and the foot portions being overmolded thermoplastic elastomer;

with the legs extending longitudinally a distance of extension beyond the ends of the cuttingboard; and with the distance of extension of the legs being adjustable.

* * * * *